Patented Feb. 12, 1946

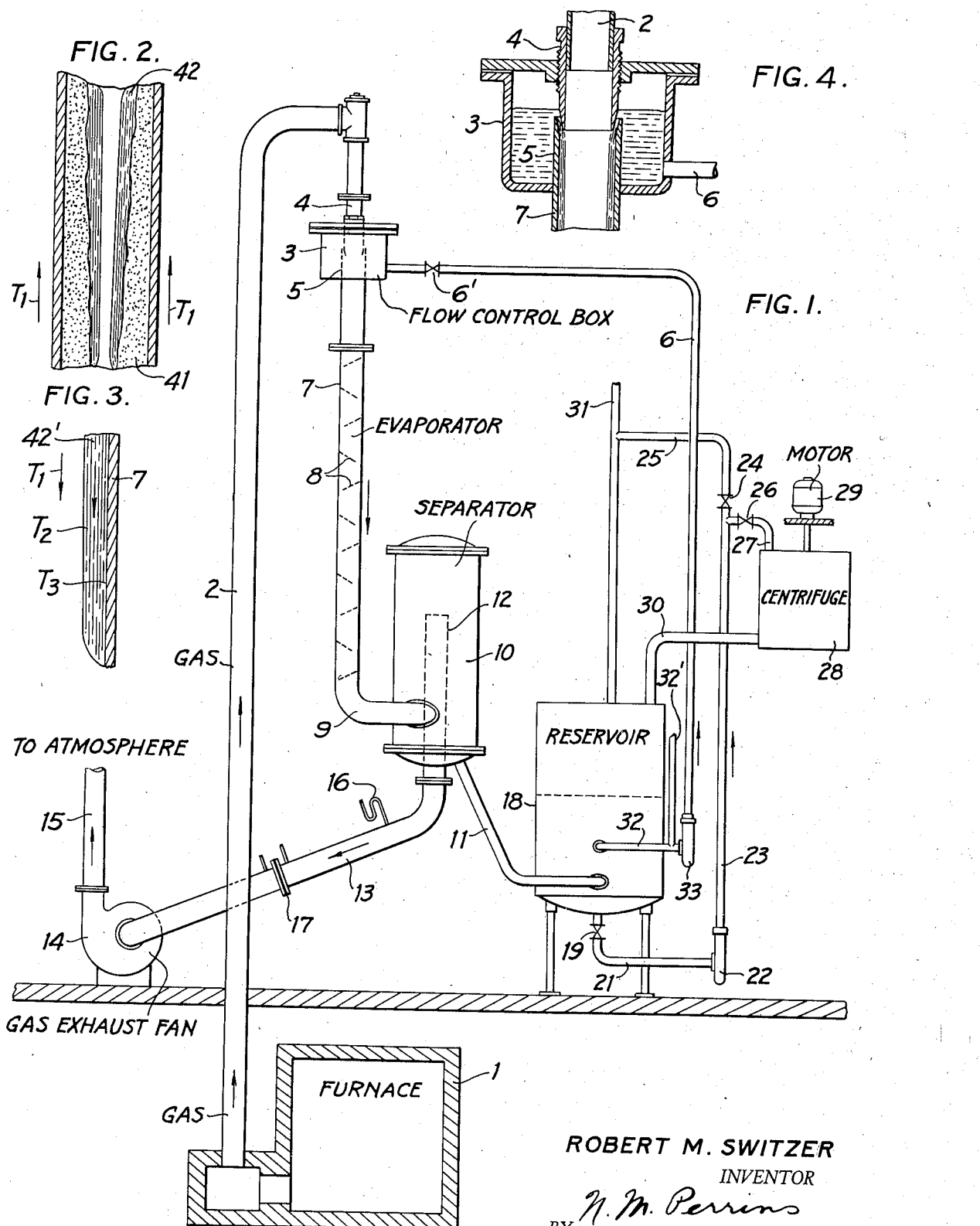

2,394,643

UNITED STATES PATENT OFFICE 2,394,643

EVAPORATION PROCESS

Robert M. Switzer, Kingsport, Tenn., assignor to Eastman Kodak Company, Rochester, N. Y., a corporation of New Jersey Application February 2, 1944, Serial No. 520,797

3 Claims. (Cl. 159—49)

This invention relates to the evaporation of salt-containing solutions and more particularly to the evaporation of solutions of salts which have inverted solubility, i. e. salts which have decreasing solubility with increasing temperature.

Frequently in operating chemical processes it is desirable to concentrate various salt solutions (usually aqueous) so as to crystallize out, the salt from such solutions. This is normally accomplished by various types of evaporators in which heat-containing gases are circulated counter current to the flow of the salt-containing solution, thus continuously evaporating the water from the solution and thereby concentrating it. This procedure works satisfactorily when dealing with solutions of salts which have normal solubility curves, i. e. which exhibit increasing solubility with increased temperature. However, when it is attempted to evaporate in this manner, solutions of salts which have the characteristic of inverted solubility, i. e. decreasing solubility with increasing temperature, the result is that incrustations or scale rapidly form upon the evaporator surface, particularly at the point in the evaporator where the concentrated solution leaves the evaporator and the hot gases enter the evaporator, and the process is very quickly put out of operation until the scale is removed from the evaporator surface. Even more pronounced scale formation occurs with such solutions when evaporated by means of indirect heating, such as with the shell and tube type evaporator where the heat is transmitted through a metal surface over which the solution flows; with any evaporator involving this principle, the hottest point is where the liquid contacts the evaporator surface and scale forms very rapidly upon such surface and must be removed. In either event, this scale removal is extremely costly, frequently requiring drilling away of the scale with frequent damage to the evaporator surface; in fact, the scale adheres so tenaciously, at times, to the evaporator surface that removal is impossible and the evaporator surface must be replaced at great cost.

I have found that such incrustations and scaling during the continuous evaporation of solutions of salts with inverted solubility can be virtually eliminated by direct contact of heat-containing gases with the salt solution to be evaporated, so long as the gas is caused to flow concurrent with the flow of the salt-containing liquid over the evaporator surface and in gas-to-liquid heat exchange relationship. By so doing, no part of the apparatus (evaporator surface) is ever at a higher temperature than the liquid with which it is in contact. Thus the decrease in solubility of the salt with temperature increase of the solution does not cause separation of the salt from the solution, upon the evaporator surface. By my process of evaporation the evaporator surface is not heated by any direct means, the flowing solution continuously wipes the evaporator surface and the heat is applied to the surface of the liquid which is most remote from the evaporator surface, i. e. a concurrent gas-to-liquid heat exchange. Thus the solubility of the salt is decreased to the greatest extent at the surface of the liquid most remote from the evaporator surface (rather than at the evaporator surface as in the shell and tube type) and incrustations cannot take place upon the evaporator surface; continuous operation is entirely feasible and the evaporator surface remains clean at all times. It might be thought that counter-current gas-to-liquid heat exchange would accomplish substantially the same result as my invention but such is not the case because of structural limitations. In the construction of any evaporator the liquid and gas must be baffled so as to obtain a reasonable degree of heat exchange, as otherwise it would require columns, tubes or surfaces of unreasonable size or length to obtain any reasonable efficiency. When the counter-current gas-to-liquid heat exchange principle is employed, such baffles become very hot due to the high temperature of the incoming gases and scaling over occurs very rapidly because of the contact of the hot gas with the exposed portion of the baffle. It is only with the concurrent gas-to-liquid principle of my invention that such localized heating can be avoided.

It is, therefore, an object of my invention to accomplish evaporation of solutions containing salts having inverted solubility, in a manner which avoids incrustation or scaling of the salt upon the evaporator surface. It is a further object of my invention to continuously evaporate solutions containing salts having inverted solubility, by applying heat-containing gases concurrently with the flow of the salt-containing solution over an evaporator surface and at the surface of the solution. Other objects of my invention will be apparent as this description proceeds and all of such objects are obtained in the manner above set forth and in accordance with the description and drawing herewith.

In Fig. 1 of the drawing there is diagrammatically depicted in elevation, with certain parts in section, an evaporator system for carrying out my invention.

Fig. 2 is an enlarged vertical section of the lower (outlet) portion of the usual tube evaporator surface employing counter-current heat exchange upon solutions of salts of inverted solubility.

Fig. 3 is an enlarged vertical section of the lower (outlet) portion of an evaporator surface employing my concurrent heat exchange principle, upon solutions of salts of inverted solubility, and Fig. 4 is an enlarged vertical section of the flow-control box.

In the drawing is represented a furnace 1 (suitably fired) which supplies hot gases through the line 2 of the flow-control box 3. This flow-control box is a cylindrical structure into the upper part of which extends a pipe 4 having an outside diameter equal to the inside diameter of the pipe 5 which extends up through the bottom of the box. The upper pipe 4 is adjustable upperward and downward so that it permits the desired flow of liquid from the box in a thin layer downwardly over the inside walls of pipe 5. Salt-containing solution to be evaporated is supplied through the pipe 6 (controlled by a valve 6') into the side of the flow control box 3 as will be described hereinafter. The pipe 5 is connected with the vertically placed evaporator 7 which evaporator is preferably provided with a series of baffles 8 to break up the flow of the solution as it passes downwardly through the evaporator. At the lower end of the evaporator an elbow 9 conducts the partially evaporated solution (containing suspended salt crystals) tangentially into the separator 10 where the liquid settles out and passes from the separator through the pipe 11 while the gases pass from the separator through the pipe 12 from whence the gases are pulled through the line 13 by pump 14 which exhausts into the atmosphere. The line 13 may be provided with a manometer 16 for ascertaining the vacuum in the line and an adjustable orifice 17 for controlling and/or measuring the flow of the gas through the line. As the concentrated solution passes through the line 11 it tangentially enters into the reservoir 18 from whence it may be conducted through the line 21 controlled by a valve 19. A pump 22 causes the slurry of crystals and solution to be conducted upwardly through the line 23 and return to the reservoir through line 25 controlled by valve 24 (to agitate the suspension) or the slurry may, by closing valve 24 and opening valve 26, be conducted through line 27 into the centrifuge 28 operated by motor 29 to remove salt crystals. From the centrifuge the mother liquor is returned to the reservoir 18 by means of line 30. The operation of separators, reservoirs, centrifuges, etc., are well known to those skilled in the art and need not be further described.

Unevaporated salt-containing solution may be introduced into the system through the line 31 or alternatively through line 32'. The feed solution (fed through line 31) mixes with concentrated solution in reservoir 18; feed solution fed through line 32' mixes with solution in line 32. At a point above the layer of the crystals in the bottom of the reservoir a line 32, connected tangentially to the reservoir, can withdraw salt-containing solution from the reservoir by means of pump 33 which pumps the liquid upwardly through line 6 into the flow control box 3 from whence the liquid again flows down through the evaporator to repeat the cycle of evaporating water or other liquid from the solution and increasing the salt content of the solution to the point where salt will crystallize and separate out.

Thus by maintaining a constant flow of hot gases through the line 2 into the evaporator 7 and a constant flow of salt-containing solution through the control box 3, my process will operate continuously with no scale formation. The incoming salt solution is maintained at a constant level as shown in the control box 3 thus continuously supplying a thin layer of salt solution to the inside surface of the evaporator 7. The valve 6' will control the flow of the salt solution into the control box 3 and adjustment of the pipe 4 upward or downward will increase or decrease respectively the annular opening between the pipes 4 and 5 so as to regulate the flow of the salt solution along the inside surface of the evaporator 7. Any other suitable type of flow box which will deliver an annular stream of liquid to the evaporator surface, may be employed.

A typical salt solution which may be concentrated in accordance with my process is a solution of manganese sulfate, resulting from the production of quinone in accordance with a process such as that described in U. S. Patents Nos. 1,998,177 and 2,043,912. Such a solution (sp. gr. 1.300) may contain approximately, 45% by weight of dissolved salts of which from 65–80% is manganese sulfate, the solution being a slightly acid aqueous solution. Depending upon the salt solution to be evaporated, the evaporator 7, separator 10, reservoir 18, centrifuge 28, and the intervening lines must be constructed of materials which will adequately resist corrosion by the salt solution. In the case of the slightly acid solution of manganese sulfate I employ copper for construction of the various pieces of apparatus which the salt solution contacts. Also in the case of the manganese sulfate solution, the temperature of the gases entering the evaporator may range from 700–800° C. and the temperature of the manganese sulfate solution entering the flow box 3 is conveniently at approximately 75° C. although obviously the salt solution may enter the evaporator at any convenient temperature. With one set-up, a hot air flow of 140–170 cu. ft. per minute was found satisfactory, which permitted a salt solution fed rate of 600–900 cc. per minute. It will be obvious to those skilled in the art that these conditions of operation can be varied considerably. Thus the greater the feed return desired, the greater must be the throughput of heat units to evaporate the water from the salt solution.

Other salts of inverted solubility, solutions of which may be concentrated in accordance with my process are sodium sulfate, sodium carbonate, ferrous sulfate and thorium sulfate. It will be obvious from the foregoing description that any solution of any salt of inverted solubility may be concentrated in accordance with my novel process. It does not matter in what solute the salt is dissolved, nor in what concentration, it merely being necessary to adjust the feed rate through the evaporator and the temperature and flow of heat-containing gases through the evaporator in such a manner that the desired number of heat units are employed for removing the desired percentage of solute from the salt solution, all of which will be readily understood by those skilled in the art.

In Fig. 2 I have illustrated what happens with the usual shell and tube evaporation method;

since with this method the gases enter the bottom of the evaporator at a very high temperature $T_1$ (relatively) and heat the tube through which the salt solution flows, the heat is sufficient at the point of contact of the solution 42 with the tube to raise the temperature of the salt solution to a point where the diminishing solubility of the salt causes the salt to precipitate out and deposit as scale 41 upon the surface of the evaporator 7. This effect builds up rapidly to such a point that the apparatus is put out of commission within a relatively short time such as in a few hours.

It is this same scaling difficulty which makes counter-current operation impossible with gas-to-liquid contact, i. e. when operating counter-currentwise with a baffled column the hot gases entering the bottom of the column heat the baffles to a high temperature even though liquid is flowing thereover. As the salt solution flows over such hot baffles, scale rapidly deposits on such baffles in the same manner as takes place with the shell and tube type of evaporator and soon puts the evaporator out of operation.

In Fig. 3 I have depicted what happens in the operation of my process; the hot gases travel downwardly through the evaporator at $T_1$. The liquid 42' also travels downwardly and the surface of the liquid quickly reaches a temperature of $T_2$. As the liquid travels downwardly the heat units are absorbed in causing evaporation of the liquid from the surface of the liquid with the result that the surface of the evaporator 7 is always at a lower temperature, namely $T_3$, than any part of the salt solution, which is at $T_2$ at any particular point in the system.

Thus in accordance with my method, solutions of salts having inverted solubility can be continuously evaporated hour after hour and day after day without any scale formation taking place whereas with counter-current heat exchange evaporators, scale rapidly builds up at the outlet end of the evaporator and the process is soon put out of operation.

What I claim is:

1. The method of concentrating solutions of salts having inverted solubility which comprises passing the solution in a relatively thin layer over an evaporator surface and passing hot gases concurrent with the flow of said solution and in direct contact with the surface of the solution.

2. The method of concentrating solutions of salts having inverted solubility which comprises passing the solution downwardly through an evaporator tower in a thin layer over the inside of the tower and at the same time passing hot gases downwardly through the tower in direct contact with the surface of the solution.

3. The method of concentrating a solution of manganese sulfate which comprises passing the solution in a relatively thin layer over an evaporator surface and passing hot gases in concurrent heat exchange relationship with the flow of the solution to be evaporated and in direct contact with the surface of such solution.

ROBERT M. SWITZER.